(12) United States Patent
Furuki

(10) Patent No.: US 6,243,229 B1
(45) Date of Patent: Jun. 5, 2001

(54) FLOPPY DISC DRIVE CHUCKING DEVICE

(75) Inventor: Shigeru Furuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/387,007

(22) Filed: Aug. 31, 1999

(30) Foreign Application Priority Data

Sep. 1, 1998 (JP) .................................................. 10-247606

(51) Int. Cl.[7] .................................................... G11B 17/02
(52) U.S. Cl. .......................................................... 360/99.04
(58) Field of Search ............................... 360/99.04, 99.08

(56) References Cited

U.S. PATENT DOCUMENTS 4,825,314   4/1989   Maekawa et al. .
5,610,779 *  3/1997   Kawana ............................. 360/99.04
5,701,217 * 12/1997   Yokouchi .......................... 360/99.05

* cited by examiner

Primary Examiner—Robert S. Tupper
(74) Attorney, Agent, or Firm—Brinks Hofer Gilson & Lione

(57) ABSTRACT

A floppy disc drive device including a drive arm held as a result of being attracted upward. Both ends of the drive arm are loosely suspended from a rotor yoke. A drive pin is formed on the front portion of the drive arm. It loosely passes through a drive pin through hole formed in the rotor yoke. It is loosely inserted into a hole formed in the center hub. At a back edge, defining the drive pin through hole and formed so as to come into contact with the drive pin, is formed a guide path, a side of which gradually inclines backwards as it extends away from the center of rotation of the rotor yoke. When the rotor yoke with a floppy disc placed thereon is rotated, the drive pin is interposed between a front edge defining the hole formed in the center hub and a side defining the guide path, and pushed towards an outer edge defining the hole.

8 Claims, 4 Drawing Sheets

FLOPPY DISC DRIVE CHUCKING DEVICE

BACKGROUND OF THE INVENTION

1. Field of the Invention

The present invention relates to a floppy disk drive (FDD) chucking device which can easily and precisely perform a centering operation (that is, a drive shaft alignment operation) when a floppy disc is being loaded into the floppy disc drive.

2. Description of the Related Art

Record media (typified by floppy disks), that is, disc cartridges, are loaded into a floppy disc drive. A disc cartridge is a case containing a thin record disc. In a floppy disc drive, the record disc is rotated, and input operations of record data and output operations of recorded data are carried out through a write/read window (which opens to the case) provided with a shutter. A floppy disc drive must be capable of allowing easy removal of the record disc contained in the case from the floppy disc drive, precisely aligning the record disc with the axis of rotation of the floppy disc drive during write/read operations, and precisely controlling the rotational speed of the record disc. To achieve this, a chucking device, such as that shown in FIGS. 6 and 7, has been conventionally used in floppy disc drives.

A record disc, or a floppy disc, has a center hub at the center portion thereof. In FIGS. 6 and 7, the center hub 2 has a substantially square center hole 3 formed in the center portion thereof, and a substantially rectangular hole 4 formed in a peripheral edge portion thereof. The hole 4 is defined by a front edge 4a (being formed in correspondence with the front portion of a rotor yoke in the direction of rotation thereof) and an outer edge 4b (formed away from the center of rotation of the rotor yoke). Hereinafter, the direction away from the center of rotation of the rotor yoke is referred to as the outward direction.

A floppy disc drive includes a rotor yoke 101, which is a ferromagnetic metallic disc rotationally driven by a motor (not shown) in a certain direction (in the direction of arrow D in FIGS. 6 and 7). A magnetic disc (or a chucking magnet) 102 is affixed to the top portion of the rotor yoke 101.

A center shaft 103 is provided in a standing manner at the rotational center O of the rotor yoke 101. It passes through a hole 102a formed in the center portion of the magnetic disc 102. It is provided so as to be loosely inserted into the center hole 3 formed in the center hub 2.

Hereinafter, the term "loosely" will be used to describe a state in which the center shaft 103 can move freely horizontally and vertically within a predetermined range.

An arc-shaped drive pin through hole 104 is formed in a peripheral edge portion of the rotor yoke 101, along a circumference of the rotor yoke 101. An arc-shaped chucking arm 105 is loosely provided in the drive pin through hole 104. It is formed by molding, along a circumference of the through hole 104. An upwardly extending drive pin 106 is formed on an end portion (hereunder referred to as the "front portion") 105a of the chucking arm 105 oriented in the rotational direction D of the rotor yoke 101. The drive pin 106 loosely passes through a front portion opening 102b formed in the magnetic disc 102. It is provided so as to be loosely inserted into the hole 4 formed in the center hub 2. On the front portion 105a are formed flanges 105c and 105c, which support the front portion of the chucking arm 105 so that the chucking arm 105 can move horizontally and vertically within a predetermined range. When the front portion of the chucking arm 105 is movably supported, the portion of the rotor yoke 101 located adjacent the front portion of the drive pin through hole 104 is loosely disposed between the flanges 105c and 105c.

From a back end of the drive pin through hole 104 formed in the rotor yoke 101, the other end portion (hereinafter referred to as the "back portion") 105b of the chucking arm 105 extends towards the back, along the top surface of the rotor yoke 101 so as to form an L shape. In a back portion opening 102c formed in the magnetic disc 102, a sliding shaft 108 which protrudes from the top surface of the rotor yoke 101 is received by a receiving hole 105d, thereby allowing the back portion of the chucking arm 105 to slide horizontally within a range corresponding to the width of the drive pin through hole 104, with the sliding shaft 108 as center.

A ferromagnetic plate 109 is mounted to the top portion of the body of the chucking arm 105, and functions to magnetically attract the entire chucking arm 105, so that the drive pin 106 is pushed upward at all times.

When a floppy disc is loaded into the floppy disc drive, a record disc is placed on top of the rotor yoke 101. The center hub 2 of the record disc is magnetically attracted to the magnetic disc 102, and the center hole 3 formed in the center hub 2 receives the center shaft 103 disposed at the rotor yoke side. Here, the drive pin 106 which protrudes above the magnetic disc 102 does not have to be inserted into the hole 4 formed in the center hub 2. When the drive pin 106 is not inserted in the hole 4, it is pushed by the center hub 2 to the level of the lower surface of the center hub 2, against the force of attraction of the ferromagnetic plate 109.

Here, within the time the rotor yoke 101 rotates not more than once in the direction of arrow D as a result of starting a motor (not shown), the top portion of the drive pin 106 slidably rotates at the lower surface of the center hub 2, and moves upward into the hole 4 by the force of attraction of the ferromagnetic plate 109. When the drive pin 106 has moved upward into the hole 4, further rotation of the rotor yoke 101 in the direction of arrow D causes the chucking arm 105 to slide in the same direction that the drive pin 106 moves when the drive pin 106 moves away from the rotational center O, by the centrifugal force produced by the rotation of the rotor yoke 101. This causes the drive pin 106 to come into contact with the outer edge 4b defining the hole 4. In addition, it slidably moves forward in the hole 4 by the rotational force of the rotor yoke 101 so as to come into contact with the front edge 4a defining the hole 4. Accordingly, the drive pin 106 comes into contact with and is supported by the front edge 4a and the outer edge 4b defining the hole 4.

At this time, the center shaft 103 comes into contact with and is supported by two adjacent sides 3a and 3b defining the center hole 3 of the center hub 2. The adjacent sides 3a and 3b oppose the drive pin 106, with the rotational center O being located between the two sides 3a and 3b. When the center of the record disc and the rotational center O of the center yoke 101 coincide (i.e. when the center shaft 103 is supported by the two sides 3a and 3b), the chucking operation is completed. When the two centers coincide, the record disc, or the floppy disc, is centered as it rotates, so that it can rotate precisely in accordance with the controlled rotational speed of the rotor yoke 101.

The above-described conventional chucking device utilizes a chucking arm 105 to support the drive pin 106 at the front edge 4a and at the outer edge 4b defining the hole 4. However, since the drive pin 106 is supported only by sliding the drive pin 106 due to the centrifugal force produced from the chucking arm 105, sliding resistance or the like is produced between the chucking arm 105 and the center hub 2, causing the drive pin 106, which has not come into contact with the outer edge 4b, to stop sliding. The record disc may start to rotate continuously even though the drive pin 106 has not come into contact with the outer edge 4b. In this case, the record disc is not at its proper location corresponding to the location where it is disposed when the drive pin 106 is supported at the front edge and the outer edge, resulting in write/read operation errors.

In addition, it is troublesome to incorporate the chucking arm 105, resulting in increased manufacturing costs.

SUMMARY OF THE INVENTION

To overcome the above-described problems, it is an object of the present invention to provide a floppy disc drive chucking device which can support a drive pin by a front edge and an outer edge defining a hole by a reliable and low cost means, so that the record disc is centered for rotation, in order to achieve precise write/readout operations at all times.

To this end, according to one aspect of the present invention, there is provided a floppy disc drive chucking device comprising:

a rotor yoke which rotates in a certain direction;

a center shaft, provided in a standing manner at the center of rotation of the rotor yoke, for being loosely inserted into a center hole formed in a center hub;

a drive arm provided at a lower side of the rotor yoke so as to extend along a circumference thereof, both ends of the drive arm being loosely suspended from the rotor yoke, the drive arm being held as a result of being attracted upward;

a drive pin formed on a front portion of the drive arm in a direction of rotation of the rotor yoke, the drive pin loosely passing through a drive pin through hole so as to extend upward, the drive pin through hole being formed in the rotor yoke, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke; and a guide path formed at a back edge defining the drive pin through hole, a side of the guide path gradually inclining backwards as the side of the guide path extends away from the center of rotation of the rotor yoke, the back edge defining the drive pin through hole being formed so as to come into contact with the drive pin;

wherein when the rotor yoke with a floppy disc placed thereon is rotated, the drive pin is interposed between the front edge defining the hole formed in the center hub and the side of the guide path, and pushed towards the outer edge defining the hole formed in the center hub.

As a result, the drive pin can be reliably inserted into the hole formed in the center hub within the time required for the rotor yoke to rotate not more than once. This is because the drive pin is formed on a drive arm held by being attracted upward. In addition, reliable chucking of the floppy disc is achieved when the drive pin is supported by a front edge and an outer edge. The supporting of the drive pin is achieved in the following way. When the rotor yoke rotates in a certain direction, the drive pin comes into contact with the front edge defining the hole formed in the center hub, and is interposed between the front edge and a side of the guide path. Interposing the drive pin between the front edge and a side of the guide path causes the drive pin to be pushed outward, towards the outer edge defining the hole formed in the center hub. Further, the drive pin can reliably be brought into contact with the outer edge, so that the floppy disc is centered for rotation. This is because the drive arm is loosely suspended from the rotor yoke, making it unnecessary to use a sliding shaft. When a sliding shaft is not used, the problem of sliding resistance does not exist.

The drive arm may be suspended from and held by the rotor yoke through a front flange and a back flange, with the front flange loosely engaging a portion of a top surface of the rotor yoke located at the back edge defining the drive pin through hole, and the back flange being formed on a back portion of the drive arm and being placed on a portion of the top surface of the rotor yoke located at the back portion of the drive arm.

In such a case, the drive pin can move vertically because the front flange loosely engages the top surface of the rotor yoke. In addition, when the drive pin is not inserted in the hole formed in the center hub, it can dip to the level of the lower surface of the center hub. Further, it is possible to eliminate the problem of the drive arm getting dislodged from the rotor yoke due to vibration or the like because the drive arm is retained by the front flange and the back flange. Still further, sliding resistance can be minimized when supporting the drive pin by the front edge and the outer edge because the drive arm is made to float as a result of being attracted upward during rotation of the rotor yoke.

A cutout which extends through the drive arm may be formed in a side portion of the back flange, wherein when mounting the drive arm to the rotor yoke, a side defining the cutout is flexed so that the drive arm is reduced in length, and wherein after the mounting of the drive arm to the rotor yoke, the cutout is restored to its original shape.

In such a case, the drive arm can be very easily mounted to the rotor yoke during the production process. In addition, it is possible to eliminate the problem of the rotor yoke getting dislodged due to vibration or the like after the mounting of the drive arm.

When the floppy disc drive chucking device of one aspect of the present invention is used, a magnetic disc may be placed on top of the rotor yoke to magnetically attract the center hub of the floppy disc, with the magnetic disc having a cutout hole formed therein to loosely receive the drive arm. In addition, at least the top surface of the body of the drive arm may be formed of a ferromagnetic material, which is attracted to the magnetic disc to hold the drive arm by attracting the drive arm upward.

In such a case, magnetic discs conventionally used in floppy disc drives can be used to attract and hold the drive arm, making it unnecessary to use additional means to attract and hold the drive arm.

When the floppy disc drive device of one aspect of the present invention is used, a spring may be mounted to the rotor yoke to push the drive pin away from the center of rotation of the rotor yoke.

In such a case, in addition to being pushed outward as a result of being interposed between the front edge defining the hole formed in the center hub and a side of the guide path, the drive pin is pushed towards the outer edge defining the hole formed in the center hub by the spring. Therefore, even when the front edge and a side of the guide path start pushing the drive pin with less force due to vibration or the like, it is possible to prevent decentering of the floppy disc, and axial movement of the drive pin, so that more stable chucking operations can be achieved.

According to another aspect of the present invention, there is provided a floppy disc drive device comprising:

a rotor yoke which rotates in a certain direction;

a center shaft, provided in a standing manner at the center of rotation of the rotor yoke, for being loosely inserted into a center hole formed in a center hub of a floppy disc;

a magnetic disc, placed on and affixed to the rotor yoke, for magnetically attracting the center hub of the floppy disc;

a drive arm provided at a lower side of the rotor yoke so as to extend along a circumference thereof, both ends of the drive arm being loosely suspended from the rotor yoke or the magnetic disc, the drive arm being held as a result of being attracted upward;

a drive pin formed on a front portion of the drive arm in a direction of rotation of the rotor yoke, the drive pin loosely passing through a drive pin through hole so as to extend upward, the drive pin through hole being formed in the rotor yoke or the magnetic disc, or in the rotor yoke and the magnetic disc, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke; and a guide path formed at a back edge defining the drive pin through hole, a side of the guide path gradually inclining backwards as the side of the guide path extends away from the center of rotation of the rotor yoke, the back edge defining the drive pin through hole being formed so as to come into contact with the drive pin;

wherein when the rotor yoke with the floppy disc placed thereon is rotated, the drive pin is interposed between the front edge defining the hole formed in the center hub and the side of the guide path, and pushed towards the outer edge defining the hole formed in the center hub.

As a result, the drive pin can be reliably inserted into the hole formed in the center hub within the time required for the rotor yoke to rotate not more than once. This is because the drive pin is formed on a drive arm held by being attracted upward. In addition, reliable chucking of the floppy disc is achieved when the drive pin is supported by a front edge and an outer edge. This is because when the rotor yoke rotates in a certain direction, the drive pin comes into contact with the front edge defining the hole formed in the center hub, and is interposed between the front edge and a side of the guide path. Interposing the drive pin between the front edge and a side of the guide path causes the drive pin to be pushed outward, towards the outer edge defining the hole formed in the center hub. Further, the drive pin can reliably be brought into contact with the outer edge, so that the floppy disc is centered for rotation. This is because the drive arm is loosely suspended from the rotor yoke or the magnetic disc, making it unnecessary to use a sliding shaft. When a sliding shaft is not used, the problem of sliding resistance is eliminated.

The drive arm may be suspended from and held by the rotor yoke through a front flange and a back flange, with the front flange loosely engaging a portion of a top surface of the rotor yoke or the magnetic disc located at the back edge defining the drive pin through hole, and the back flange being formed on a back portion of the drive arm and being placed on a portion of the top surface of the rotor yoke or the magnetic disc located at the back portion of the drive arm.

Accordingly, the drive pin can move vertically because the front flange loosely engages the top surface of the rotor yoke or the magnetic disc. In addition, when the drive pin is not inserted in the hole formed in the center hub, it can dip to the level of the lower surface of the center hub. Further, it is possible to eliminate the problem of the drive arm getting dislodged from the rotor yoke due to vibration or the like because the drive arm is retained by the front flange and the back flange. Still further, sliding resistance can be minimized when supporting the drive pin by the front edge and the outer edge because the drive arm is made to float as a result of being attracted upward during rotation of the rotor yoke.

A cutout which extends through the drive arm may be formed in a side portion of the back flange, wherein when mounting the drive arm to the rotor yoke, a side defining the cutout is flexed so that the drive arm is reduced in length, and wherein after the mounting of the drive arm to the rotor yoke, the cutout is restored to its original shape.

In such a case, the drive arm can be very easily mounted to the rotor yoke during the production process. In addition, it is possible to eliminate the problem of the rotor yoke getting dislodged due to vibration or the like after the mounting of the drive arm.

When the floppy disc drive chucking device of another aspect of the present invention is used, at least the top surface of the body of the drive arm may be formed of a ferromagnetic material, which is attracted to the magnetic disc to hold the drive arm by attracting the drive arm upward.

In such a case, magnetic discs conventionally used in floppy disc drives can be used to attract and hold the drive arm, making it unnecessary to use additional means to attract and hold the drive arm.

When the floppy disc drive chucking device of another aspect of the present invention is used, a spring may be mounted to the rotor yoke to push the drive pin away from the center of rotation of the rotor yoke.

In such a case, in addition to being pushed outward as a result of being interposed between the front edge defining the hole formed in the center hub and a side of the guide path, the drive pin is pushed towards the outer edge defining the hole formed in the center hub by the spring. Therefore, even when the front edge and a side of the guide path start pushing the drive pin with less force due to vibration or the like, it is possible to prevent decentering of the floppy disc, and axial movement of the drive pin, so that more stable chucking operations can be achieved.

DESCRIPTION OF THE PREFERRED EMBODIMENTS

A description will now be given of embodiments of the chucking device in accordance with the present invention.

Figure 1:
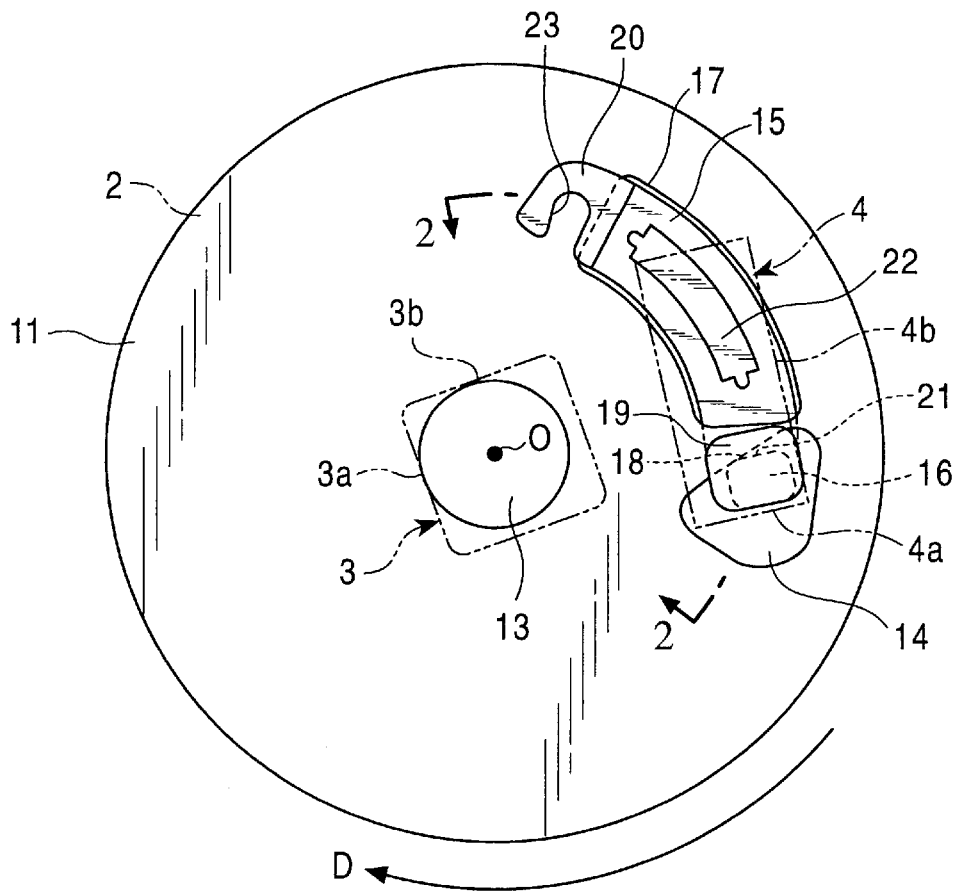
FIG. 1 is a plan view of an embodiment of the present invention.
Figure 2:
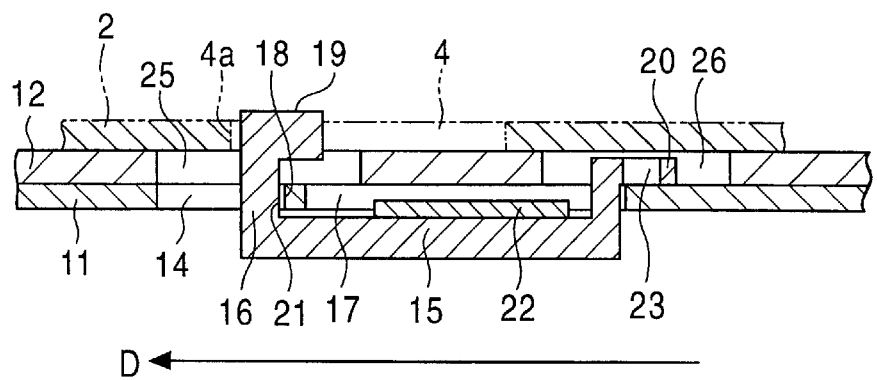
FIG. 2 is a sectional view taken along arcuate line 2—2 of FIG. 1.
Figure 6:
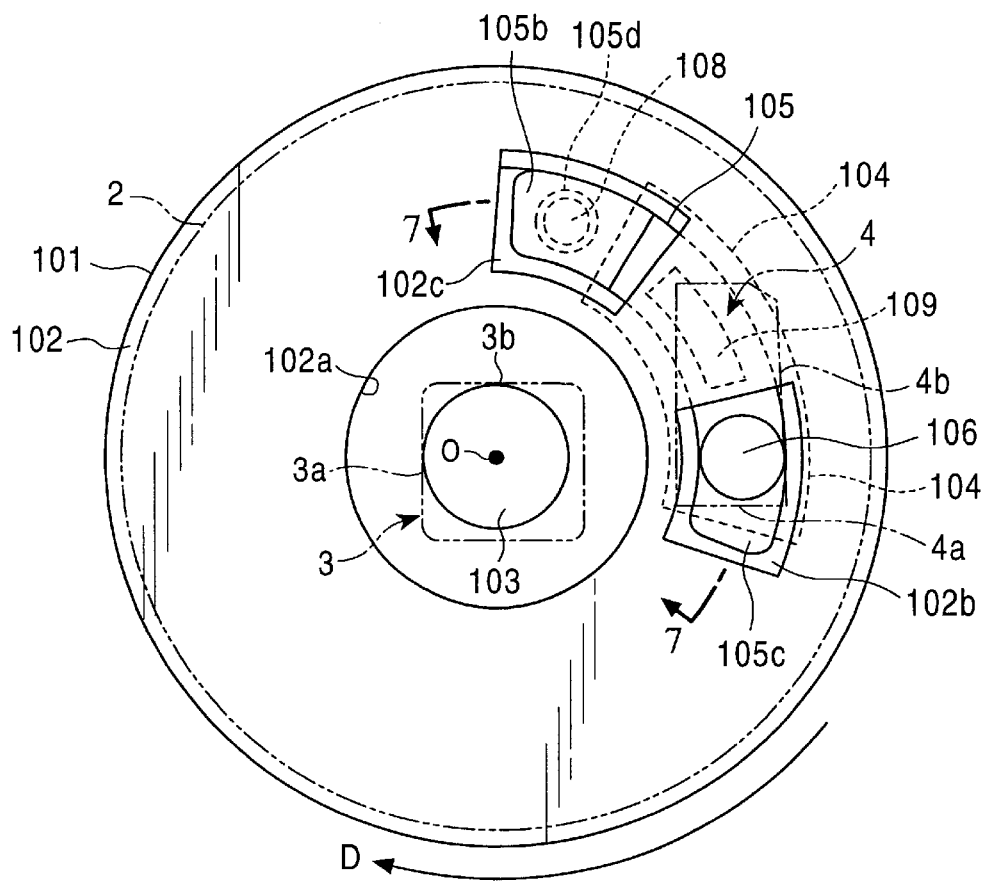
FIG. 6 is a plan view of a conventional chucking device.
Figure 7:
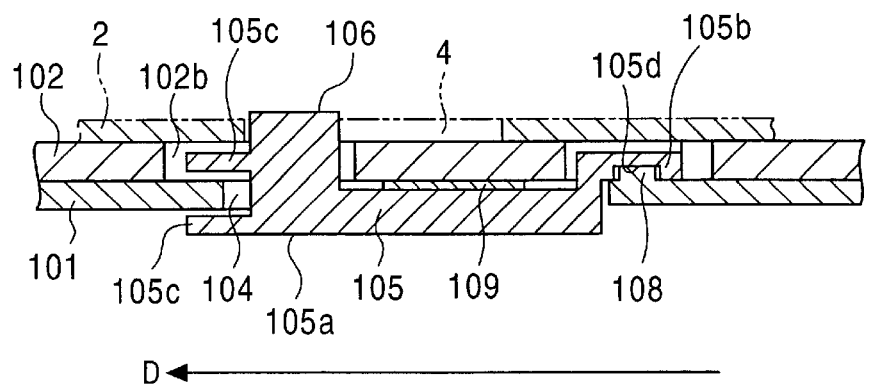
FIG. 7 is a sectional view taken along arcuate line 7—7 of FIG. 6.

FIGS. 1 and 2 both illustrate a portion of a floppy disc drive (FDD) provided with a floppy disc drive chucking device in accordance with the present invention. For convenience, the magnetic disc 12 shown in FIG. 2 is not shown in FIG. 1. Component parts illustrated in FIGS. 1 and 2 which correspond to those illustrated in FIGS. 6 and 7 are given the same reference numerals. Descriptions of the corresponding component parts have been either simplified or omitted.

In FIGS. 1 and 2, the floppy disc drive comprises a rotor yoke 11 which is a ferromagnetic metallic disc rotationally driven in the direction of arrow D by a motor (not shown). A magnetic disc (chucking magnet) 12 is affixed to the top portion of the rotor yoke 11. A center shaft 13 is provided in a standing manner at the rotational center O of the rotor yoke 11. The center shaft 13 is inserted into a hole (not shown) formed in the center portion of the magnetic disc 12. When a floppy disc is placed on the rotor yoke 11, the center shaft 13 is loosely inserted in a center hole 3 formed in a center hub 2.

Figure 3:
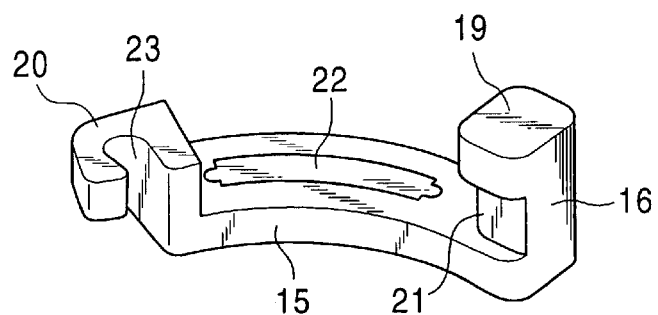
FIG. 3 is a perspective view of a drive arm, used in the embodiment of the present invention.

A drive pin through hole 14 and a drive arm receiving hole 17 are formed in a peripheral edge portion of the rotor yoke 11, along a circumference thereof such that the drive pin through hole 14 rotates ahead of the drive arm receiving hole 17 in the rotational direction D. In the drive pin through hole 14 and the drive arm receiving hole 17, an arc-shaped drive arm 15 shown in FIG. 3 extends along a circumference of the lower side of the rotor yoke 11, with both ends of the drive arm 15 being loosely suspended from the rotor yoke 11. As will be described later, the drive arm 15 is suspended through a front flange 19 and a back flange 20. The front flange 19 is formed on the top portion of the drive pin 16, while the back flange 20 is formed on the back portion of the drive arm 15. The drive arm 15 has a ferromagnetic plate 22 mounted to the top surface of the body thereof, and is held as a result of being attracted upward when the ferromagnetic plate 22 is magnetically attracted to the magnetic disc 12 disposed thereabove.

The drive pin 16 which extends upward and above the rotor yoke 11 is formed on the front portion of the drive arm 15. It loosely passes through the drive pin through hole 14 formed in the rotor yoke 11, and extends above a cutout hole 25 formed in the magnetic disc 12. It can be loosely inserted into the hole 4 formed in a peripheral edge portion of the center hub 2. As described above, the hole 4 is defined by front edge 4a and outer edge 4b.

The drive arm 15 has front flange 19 and back flange 20. The front flange 19 is formed on the top portion of the drive pin 16 so as to extend towards the back. It engages a portion of the top surface of the rotor yoke 11 located at a back edge defining the drive pin through hole 14 so that it can move vertically. The back flange 20 is formed on the back portion of the drive arm 15. It loosely passes through the drive arm receiving hole 17 formed in the rotor yoke 11 and extends to the top surface of the rotor yoke 11. It is placed on a portion of the top surface of the rotor yoke 11 located behind the drive arm receiving hole 17. The drive arm 15 is loosely suspended from the rotor yoke 11 through the front flange 19 and the back flange 20.

The drive pin through hole 14 is formed in the rotor yoke 11 such that the back edge defining the through hole 14 can come into contact with a back portion surface 21 of the drive pin 16. A guide path 18 is formed at the back edge which can come into contact with the drive pin 16. A side of the guide path 18 gradually inclines backwards (or in a direction opposite to the rotational direction D) as it extends away from the rotational center O of the rotor yoke 11.

Figure 5:
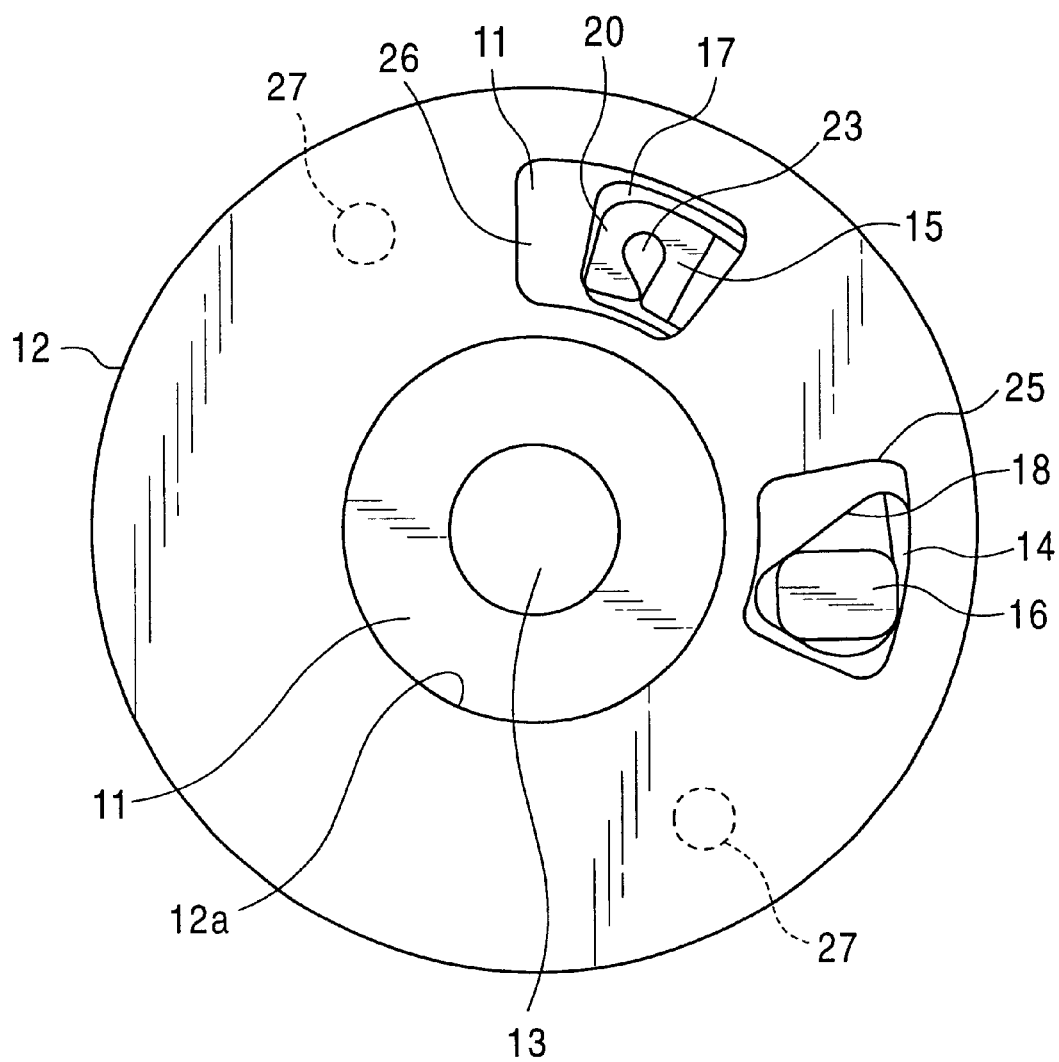
FIG. 5 is a plan view illustrating a production process, for a device of the present invention.

As shown in FIG. 5, the magnetic disc 12 has a hole 12a, a cutout hole 25, and a cutout hole 26. The hole 12a is formed in the center portion of the magnetic disc 12 so as to receive the center shaft 13. Here, the center shaft 13 is inserted into the hole 12a so that it does not come into contact with the side of the hole 12a. The cutout hole 25 is formed along the circumference of the magnetic disc 12 and with a shape which does not prevent movement of the drive pin 16 in the drive pin through hole 14. The cutout hole 26 is also formed along the circumference of the magnetic disc 12 so as to accommodate the back flange 20 loosely. The magnetic disc 12 is magnetically attracted to the top surface of the rotor yoke 11. The magnetic disc 12 is mounted to the rotor yoke 11 with bosses and boss holes 27 (with the center shaft 13 being disposed between the bosses and the boss holes 27) so that the magnetic disc 12 does not rotate with respect to the rotor yoke 11.

It is preferable that a cutout hole (not shown) be formed opposite the cutout holes 25 and 26 to keep the rotor yoke 11 balanced during rotation thereof. Here, the rotational center O is located among the three cutout holes.

It is to be noted that the drive pin through hole 14, formed in the rotor yoke 11, may be larger than the cutout hole 25, formed in the magnetic disc 12, and a guide path, similar to the guide path 18, may also be formed in the cutout hole 25. Here, the drive arm 15 is loosely suspended from the magnetic disc 12 by the front flange 19 and the back flange 20.

When a floppy disc is loaded into the above-described floppy disc drive, it is placed on top of the rotor yoke 11, and the center shaft 13 inserted in the rotor yoke 11 and is received by the center hub 2 of the record disc. It is not necessary that, the drive pin 16, which protrudes above the magnetic disc 12, be inserted into the hole 4 formed in the center hub 2. When it is not inserted in the hole 4, the drive pin 16 is pushed by the center hub 2 from thereabove to the level of the lower surface of the center hub 2, against the attraction force between the magnetic disc 12 and the ferromagnetic plate 22. Since the front portion of the drive arm 15 is loosely suspended through the front flange 19, the drive pin 16 can be dipped to the level of the lower surface of the center hub 2.

Within one rotation of the rotor yoke 11 in the direction of arrow D, as a result of starting a motor (not shown), the top portion of the drive pin 16 attracted upward slidably rotates at the lower surface of the center hub 2 and reaches the hole 4. Then, it moves upward due to the attraction force between the magnetic disc 12 and the ferromagnetic plate 22, whereby it is inserted into the hole 4. With the drive pin 16 being inserted in the hole 4, when the rotor yoke 11 rotates further in the direction of arrow D, the drive pin 16 slidably moves forward in the hole 4 and comes into contact with the front edge 4a of the hole 4.

When the drive pin 16 comes into contact with the front edge 4a, it is pushed backward, and comes into contact with a side of the guide path 18. This means that the drive pin 16 is interposed between the front edge 4a and a side of the guide path 18, and pushed. Since the side of the guide path 18 gradually inclines backwards (or in a direction opposite to the rotational direction D) as it extends away from the rotational center O of the rotor yoke 11, the resultant of the two force components due to the guide path 18 and the front edge 4a is directed outward in the direction of arrow g. This outward resultant force pushes the drive pin 16 outward, and causes the drive pin 16 to come into contact with the outer edge 4b of the hole 4. In this way, the drive pin 16 is supported by the front edge 4a and the outer edge 4b of the hole 4.

Here, the center shaft 13 is supported by two adjacent sides 3a and 3b defining the center hole 3. The sides 3a and 3b oppose the drive pin 16, with the rotational center O being located between the sides 3a and 3b. When the center shaft 13 is supported by the two sides 3a and 3b, and the center of the record disc and the rotational center O of the center yoke 11 coincide, the chucking operation is completed. When the two centers coincide, the record disc, or the floppy disc, is centered, so that it can rotate precisely in accordance with the controlled rotational speed of the rotor yoke 11.

In another embodiment of the present invention, a pusher spring may be provided at the lower surface of the rotor yoke 11 to push the drive pin 16 outward. In this case, in addition to be pushed outward as a result of being interposed between the front edge 4a (defining the hole 4) and a side of the guide path 18, the drive pin 16 is also pushed against the outer edge 4b (defining the hole 4) by this spring. Therefore, even when the pushing force on the drive pin 16 produced as a result of interposing it between the front edge 4a and a side of the guide path 18 becomes smaller due to vibration or the like, it is possible to prevent decentering of a floppy disc when it rotates and axial movement of the drive pin 16. Consequently, more stable chucking operations can be achieved.

A cutout 23 is formed in the back flange 20 (formed on a side portion of the drive arm 15) by cutting the drive arm 15 so that the cutout 23 extends therethrough.

Figure 4:
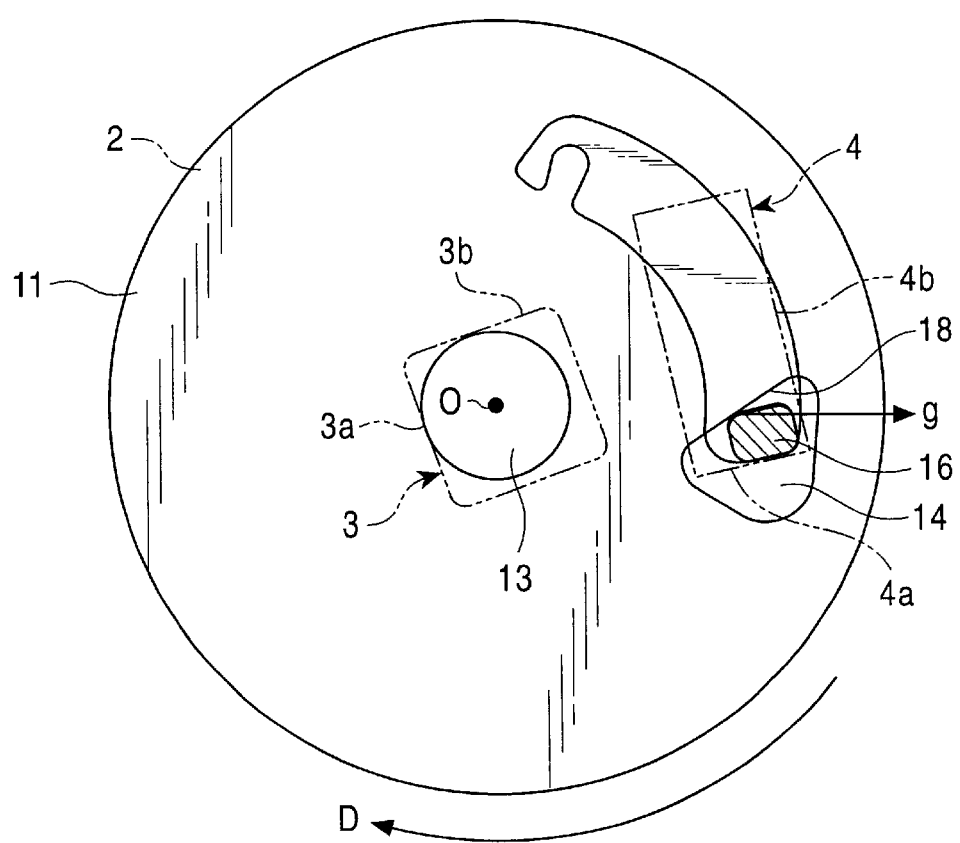
FIG. 4 is a perspective plan view used to illustrate the operation of the chucking device in accordance with the present invention.

In mounting the drive arm 15 to the rotor yoke 11, as illustrated in FIG. 4, the drive pin 16 is inserted into the drive pin through hole 14, after which the back portion of the drive arm 15 is inserted into the drive arm receiving hole 17 by flexing a side defining the cutout 23 in such a way as to reduce the width of the cutout 23 (as shown in FIG. 5). This method makes it much easier to mount the drive arm 15 to the rotor yoke 11. Removing the force flexing the side defining the cutout 23 after the mounting causes the cutout 23 to be restored to its original shape. In this way, the drive arm 15 is loosely suspended from the rotor yoke 11, so that it does not get dislodged. This makes it much easier to mount the drive arm during the production process.

In the chucking devices of the embodiments, the drive arm 15 does not have a sliding structure. Therefore, compared to the conventional chucking device shown in FIGS. 6 and 7, the embodiment of the present invention has a simpler structure and can be assembled more easily. The chucking devices of the above-described embodiments allow a drive arm to be supported by a front edge and an outer edge at a low cost, thereby preventing the record disc from becoming decentered.

What is claimed is:

1. A floppy disc drive chucking device, comprising:
   a rotor yoke which rotates in a certain direction, the rotor yoke comprising a drive pin through hole and a drive arm receiving hole;
   a center shaft, provided in a standing manner at the center of rotation of the rotor yoke, for being loosely inserted into a center hole formed in a center hub;
   a drive arm provided at a lower side of the rotor yoke so as to extend along a circumference thereof, both ends of the drive arm being loosely suspended from the rotor yoke by a front flange and a back flange, the front flange configured to loosely engage a portion of a top surface of the rotor yoke adjacent the drive pin through hole, the back flange configured to engage a portion of the top surface of the rotor yoke adjacent the drive arm receiving hole, the drive arm being biased in an upward direction;
   a drive pin formed on a front portion of the drive arm in a direction of rotation of the rotor yoke, the drive pin loosely passing through the drive pin through hole so as to extend in an upward direction, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke; and
   a guide path formed at a back edge defining the drive pin through hole, a side of the guide path gradually inclining backwards as the side of the guide path extends away from the center of rotation of the rotor yoke, the back edge defining the drive pin through hole being formed so as to come into contact with the drive pin;
   wherein when the rotor yoke with a floppy disc placed thereon is rotated, the drive pin is interposed between the front edge defining the hole formed in the center hub and the side of the guide path, and is pushed towards the outer edge defining the hole formed in the center hub.

2. A floppy disc drive chucking device according to claim 1, wherein the front flange loosely engages a portion of a top surface of the rotor yoke located at the back edge defining the drive pin through hole, and the back flange is formed on a back portion of the drive arm and is placed on a portion of the top surface of the rotor yoke located at the back portion of the drive arm.

3. A floppy disc drive chucking device according to claim 2, wherein a cutout which extends through the drive arm is formed in a side portion of the back flange, wherein when mounting the drive arm to the rotor yoke, a side defining the cutout is flexed so that the drive arm is reduced in length, and wherein after the mounting of the drive arm to the rotor yoke, the cutout is restored to its original shape.

4. A floppy disc drive chucking device according to claim 1, wherein a magnetic disc is placed on top of the rotor yoke to magnetically attract the center hub of the floppy disc, the magnetic disc having a cutout hole formed therein to loosely receive the drive arm, and wherein at least a top surface of a body of the drive arm is formed of a ferromagnetic material, said ferromagnetic material being attracted to the magnetic disc to bias the drive arm in an upward direction.

5. A floppy disc drive chucking device, comprising:
   a rotor yoke which rotates in a certain direction;
   a center shaft, provided in a standing manner at the center of rotation of the rotor yoke, for being loosely inserted into a center hole formed in a center hub of a floppy disc;
   a magnetic disc, placed on and affixed to the rotor yoke, for magnetically attracting the center hub of the floppy disc;
   a drive arm provided at a lower side of the rotor yoke so as to extend along a circumference thereof, both ends of the drive arm being loosely suspended from the rotor yoke or the magnetic disc by a front flange and a back flange, the front flange configured to loosely engage a portion of a top surface of the rotor yoke or the magnetic disc adjacent a drive pin through hole, the drive pin through hole being formed in the rotor yoke and/or the magnetic disc, the back flange configured to engage a portion of the top surface of the rotor yoke or the magnetic disc adjacent a drive arm receiving hole, the drive arm receiving hole being formed in the rotor yoke and/or the magnetic disk, the drive arm being biased in an upward direction;

a drive pin formed on a front portion of the drive arm in a direction of rotation of the rotor yoke, the drive pin loosely passing through the drive pin through hole so as to extend upward, the drive pin being provided for being loosely inserted into a hole formed in a peripheral edge of the center hub and defined by a front edge and an outer edge, the front edge being formed in correspondence with a front portion of the rotor yoke in the direction of rotation of the rotor yoke, and the outer edge being formed away from the center of rotation of the rotor yoke; and a guide path formed at a back edge defining the drive pin through hole, a side of the guide path gradually inclining backwards as the side of the guide path extends away from the center of rotation of the rotor yoke, the back edge defining the drive pin through hole being formed so as to come into contact with the drive pin;

wherein when the rotor yoke with the floppy disc placed thereon is rotated, the drive pin is interposed between the front edge defining the hole formed in the center hub and the side of the guide path, and is pushed towards the outer edge defining the hole formed in the center hub.

6. A floppy disc drive chucking device according to claim 5, wherein the front flange loosely engages a portion of a top surface of the rotor yoke or the magnetic disc located at the back edge defining the drive pin through hole, and the back flange is formed on a back portion of the drive arm and is placed on a portion of the top surface of the rotor yoke or the magnetic disc located at the back portion of the drive arm.

7. A floppy disc drive chucking device according to claim 6, wherein a cutout which extends through the drive arm is formed in a side portion of the back flange, wherein when mounting the drive arm to the rotor yoke, a side defining the cutout is flexed so that the drive arm is reduced in length, and wherein after the mounting of the drive arm to the rotor yoke, the cutout is restored to its original shape.

8. A floppy disc drive chucking device according to claim 5, wherein at least a top surface of a body of the drive arm is formed of a ferromagnetic material, said ferromagnetic material being attracted to the magnetic disc to bias the drive arm in an upward direction.

* * * * *